(12) United States Patent
Date (10) Patent No.: US 9,832,298 B2
(45) Date of Patent: Nov. 28, 2017

(54) STAND FOR SMARTPHONE AND THE LIKE

(71) Applicants: Sumio K. Date, Oceanside, CA (US); Kenzo Date, Tokyo (JP)

(72) Inventor: Kenzo Date, Tokyo (JP)

(*) Notice: Subject to any disclaimer, the term of this patent is extended or adjusted under 35 U.S.C. 154(b) by 0 days.

(21) Appl. No.: 15/416,181

(22) Filed: Jan. 26, 2017

(65) Prior Publication Data
US 2017/0230489 A1    Aug. 10, 2017

(30) Foreign Application Priority Data
Feb. 4, 2016 (JP) .................................. 2016-20207

(51) Int. Cl.
*H04B 1/38* (2015.01)
*H04M 1/04* (2006.01)

(52) U.S. Cl.
CPC ..................................... *H04M 1/04* (2013.01)

(58) Field of Classification Search
CPC ........................................................ H04M 1/04
USPC ........................................................ 455/90.3
See application file for complete search history.

(56) References Cited

U.S. PATENT DOCUMENTS

2012/0006951 A1* 1/2012 Lin ...................... A47B 23/044
248/188.6

FOREIGN PATENT DOCUMENTS

| JP | 2006-035576 | 2/2006 |
| JP | 2013-240020 | 11/2013 |

* cited by examiner

*Primary Examiner* — Sanh Phu
(74) *Attorney, Agent, or Firm* — Muramatsu & Associates (57) ABSTRACT

A stand for a member to be supported such as a smartphone or tablet terminal is not only assembled easily but also carried without difficulty in a travel, business trip or the like. A stand has a main portion made of a board which is divided into a left board, a central board and a right board, the main portion includes a mount portion, an intrusion portion, and a reception portion, the intrusion portion is provided with an intrusion slot formed upwardly, the reception portion is provided with a reception slot formed downwardly, the reception slot being capable of fitting with the intrusion slot, and the main portion is configured such that the intrusion slot and the reception slot are fitted with each other to make the central board protrude in a front-back direction from the left board and the right board, so that a member to be supported can be mounted at a lower edge of the mount portion.

4 Claims, 6 Drawing Sheets

STAND FOR SMARTPHONE AND THE LIKE

This application is based on and claims the benefit of priority of the prior Japanese Patent Application No. 2016-020207 filed Feb. 4, 2016, the entire contents of which are incorporated herein by reference.

FIELD OF THE INVENTION

The present invention is related to a stand for supporting a smartphone, tablet terminal and the like.

BACKGROUND OF THE INVENTION

Conventional stands for supporting a smartphone, tablet terminal and the like could not be assembled without using screws or adhesives, so that it was difficult to assemble them easily at the point of use. Further, conventional stands are fixed by means of a screw clamp or adhesive or made of a metal such as aluminum, so that many of them are not suitable for size-reduction. Therefore, conventional stands are bulky when stored with respect to their size, making it difficult to carry them in a travel, business trip or the like. Moreover, some of the conventional stands are made of wood, and the wood used in such stands has a certain amount of weight, so that it is difficult to carry them in a travel, business trip or the like.

A technique associated with a stand made of cardboard or the like, as an example of such conventional stands, is disclosed in Japanese Laid-Open Patent Application Publication No. 2013-240020.

Japanese Laid-Open Patent Application Publication No. 2013-240020 discloses a technique associated with a stand for a portable terminal that is assembled in the following way: a main body made of paperboard is bent along a predetermined longitudinal bend line provided beforehand thereon, then a portion of the bent part is bonded to the inside of the main body with an adhesive.

That is, as to the conventional technique disclosed by the above noted Publication No. 2013-240020, assembling cannot be performed without using an adhesive, so that if an adhesive is not attached to the stand, an adhesive should be first prepared by a user. Further, as to this conventional technique, even if an adhesive is attached, a smartphone or the like cannot be mounted until the adhesive having been applied to the stand cures, so that it takes a long time to use the stand after assembling it. Therefore, according to the conventional technique, it is difficult to assemble a stand easily at the point of use.

Moreover, as to the conventional technique of noted above, since a stand is assembled with the use of an adhesive, it is not easy to restore it to the original planar shape. Accordingly, as to the conventional technique, the stand after being, assembled tends to be bulky when stored, making it difficult to carry in a travel, business trip or the like.

SUMMARY OF THE INVENTION

Therefore, an object of the present invention is to provide a stand for a member to be supported such as a smartphone, tablet terminal or the like that can be assembled without trouble and is easy to carry in a travel, business trip or the like.

In order to achieve the object, the present invention adopts the following constitution.

(First Invention)

A stand 7 according to a first aspect of the present invention comprises a main portion 10 made of a board member, wherein when the main portion 10 is divided in an up-down direction into three parts including a left board 12, a central board 14 and a right board 16, the main portion 10 comprises a mount portion 20 which is formed by cutting the central board 14 into a concave shape directed downward, an intrusion portion 30 provided in the left board 12 connecting consecutively to a left side of the central board 14 or in the right board 16 connecting consecutively to a right side of the central board 14, and a reception portion 40 provided in the right board 16 connecting consecutively to the right side of the central board 14 or in the left board 12 connecting consecutively to the left side of the central board 14, the right or left board being not provided with the intrusion portion, wherein the intrusion portion 30 is provided with an intrusion slot 32 formed upwardly from a lower edge of the left board 12 or the right board 16 that is provided with the intrusion portion, wherein the reception portion 40 is provided with a reception slot 42 formed downwardly from an upper edge of the right board 16 or the left board 12 that is provided with the reception portion, the reception slot 42 being capable of fitting with the intrusion slot 32, and wherein the main portion 10 is configured such that the intrusion slot 32 and the reception slot 42 are fitted with each other to make the central board 14 protrude in a front-back direction from the left board 12 and the right board 16, so that a member 1 to be supported can be mounted at a lower edge of the mount portion 20.

(Second Invention)

A stand according to a second aspect of the present invention has similar characteristics to the first invention described above, wherein from vicinities of both ends of a lower edge 15 of the central board to the lower edge of the left board 12 and/or the right board 16, respective lower edges are inclined upwardly.

Here, "vicinities of both ends of a lower edge 15 of the central board" do not necessarily refer to the exact both ends of the lower edge 15 of the central board but may mean to include also locations inside or outside to some extent of the both ends.

(Third Invention)

A stand according to a third aspect of the present invention has similar characteristics to the first or second aspect described above, wherein the mount portion 20 is provided with mount recesses 22 at two locations where the mount recesses are concave further downwardly, in vicinities of both ends of the lower edge of the mount portion 20, and wherein the main portion 10 is configured such that the intrusion slot 32 and the reception slot 42 are fitted with each other to make the central board 14 protrude in the front-back direction from the left board 12 and the right board 16, so that the member 1 to be supported can be fitted in the mount recesses 22 at two locations and mounted therein.

Here, "vicinities of both ends of the lower edge of the mount portion 20" do not necessarily refer to the exact both ends of the lower edge of the mount portion 20 but may mean to include also locations inside or outside to some extent of the both ends.

Here, "mount recesses 22 at two locations where the mount recesses are concave further downwardly" mean that the mount recesses 22 are formed by denting downwardly from the lower edge of the mount portion 20.

Here, "mount recesses 22" are recesses whose width in the left-right direction is set to be slightly larger than a thickness of the member 1 to be supported.

(Fourth Invention)

A stand according to a fourth aspect of the present invention has similar characteristics to the first, second or third aspect described above, wherein the intrusion slot 32 comprises an intrusion slot first portion 32a formed upwardly from the lower edge of the left board 12 or the right board 16 that is provided with the intrusion slot, an intrusion slot second portion 32b formed rightwardly or leftwardly from an upper end of the intrusion slot first portion 32a, and an intrusion slot third portion 32c formed upwardly from an end of the intrusion slot second portion 32b, the end not connecting consecutively to the upper end of the intrusion slot first portion 32a, wherein a region between the intrusion slot second portion 32b and the lower edge of the left board 12 or the right board 16 that is provided with the intrusion slot is a first engaging protrusion 50, wherein the reception slot 42 comprises a reception slot first portion 42a formed downwardly from the upper edge of the right board 16 or the left board 12 that is provided with the reception slot, a reception slot second portion 42b formed leftwardly or rightwardly from a lower end of the reception slot first portion 42a, and a reception slot third portion 42c formed downwardly from an end of the reception slot second portion 42b, the end not connecting consecutively to the lower end of the reception slot first portion 42a, wherein a region between the reception slot second portion 42b and the upper edge of the right board 16 or the left board 12 that is provided with the reception slot is a second engaging protrusion 52, wherein a second engaging slot 56 capable of engaging with the second engaging protrusion 52 is formed in the upper edge of the left board 12 or the right board 16 that is provided with the intrusion slot and opposite to the intrusion slot third portion 32c, wherein a first engaging slot 54 capable of engaging with the first engaging protrusion 50 is formed in the lower edge of the right board 16 or the left board 12 that is provided with the reception slot and opposite to the reception slot third portion 42c, and wherein the main portion 10 is configured such that when the intrusion slot third portion 32c and the reception slot third portion 42c are fitted with each other, the first engaging slot 54 and the first engaging protrusion 50 can engage with each other, and further, the second engaging slot 56 and the second engaging protrusion 52 can engage with each other.

Here, as to "the end not connecting consecutively to the upper end of the intrusion slot first portion 32a", in the case where the intrusion slot second portion 32b is formed rightwardly from the upper end of the intrusion slot first portion 32a, the right end of the intrusion slot second portion 32b corresponds to "the end not connecting consecutively to the upper end of the intrusion slot first portion 32a". On the other hand, in the case where the intrusion slot second portion 32b is formed leftwardly from the upper end of the intrusion slot first portion 32a, the left end of the intrusion slot second portion 32b corresponds to "the end not connecting consecutively to the lower end of the intrusion slot first portion 32a".

Here, as to "the end not connecting consecutively to the lower end of the reception slot first portion 42a", in the case where the reception slot second portion 42b is formed leftwardly from the lower end of the reception slot first portion 42a, the left end of the reception slot second portion 42b corresponds to "the end not connecting consecutively to the lower end of the reception slot first portion 42a". On the other hand, in the case where the reception slot second portion 42b is formed rightwardly from the lower end of the reception slot first portion 42a, the right end of the reception slot second portion 42b corresponds to "the end not connecting consecutively to the lower end of the reception slot first portion 42a".

In the present invention, the stand can be assembled easily by simply fitting the intrusion slot formed in the left board constituting the main portion and the reception slot formed in the right board constituting the main portion with each other. Further, in the present invention, the shape before assembling can be a single board member, so that by returning the stand to the original shape before assembling, it can be accommodated in a bag, which makes it easy to carry in a travel, business trip or the like.

DETAILED DESCRIPTION OF THE INVENTION

First Embodiment

Figure 1:
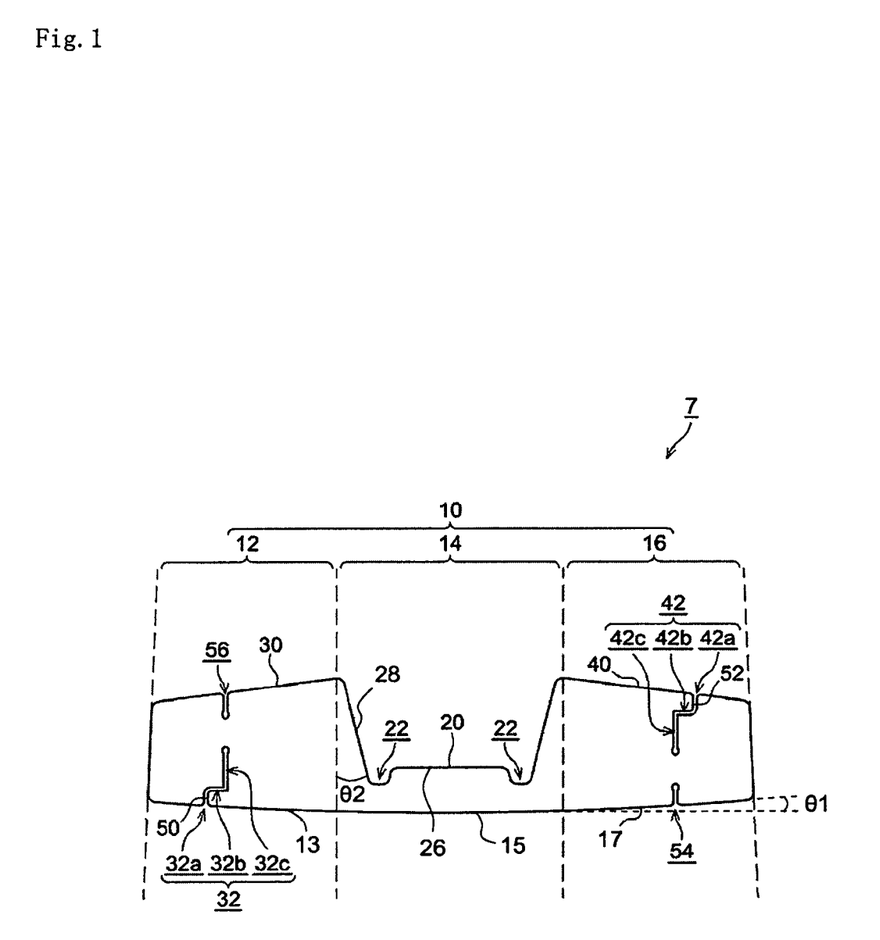
FIG. 1 is a development view of the stand of the first embodiment.
Figure 2:
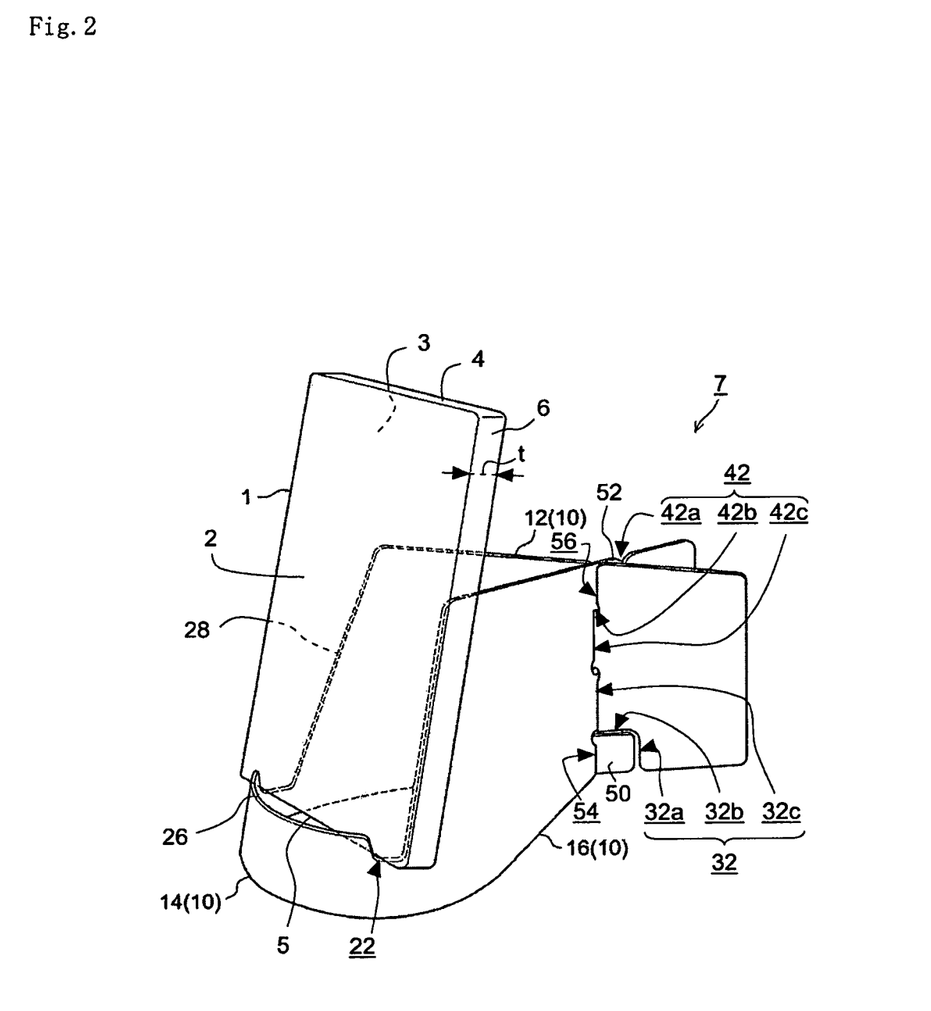
FIG. 2 is a perspective view of a stand of a first embodiment in a state where it is assembled and a member to be supported is mounted thereon.
Figure 3:
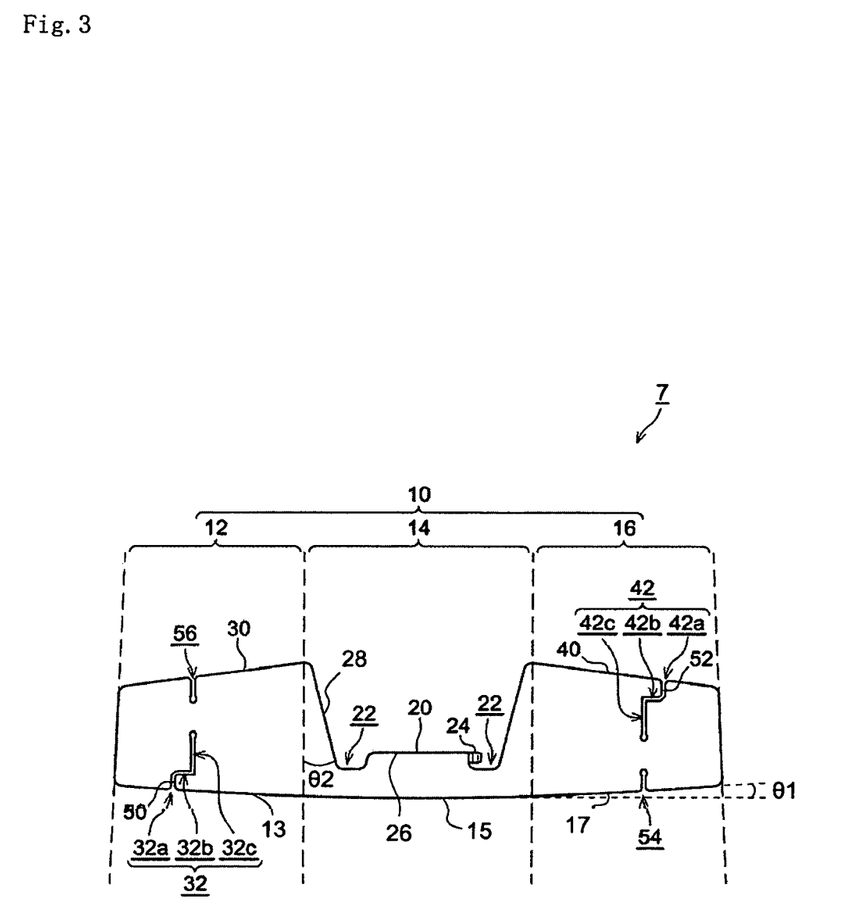
FIG. 3 is a development view of a stand of a second embodiment.

In the present invention, at every point of explanation, in a case where no definition is given as to direction, a left side of a board member, which is for forming a stand 7 shown in FIG. 1 or FIG. 3, is defined as a "left" direction, a direction opposite thereto is defined as a "right" direction, an upper side of the board member for forming the stand 7 is defined as an "up" direction, and a direction opposite thereto is defined as a "down" direction. Further, as to an up-down direction such as "up" or "down" noted above, an upper side of the stand 7 shown in FIG. 2 corresponds to an "up" direction, and a direction opposite thereto corresponds to a "down" direction. Furthermore, as to a "front-back" direction such as "front" or "back", a side where a member 1 to be supported is mounted on the stand 7 shown in FIG. 2 is defined as a "front" direction, and a direction opposite thereto is defined as a "back" direction.

(Member 1 to be Supported)

Here, the member 1 to be supported will be explained first. The member 1 to be supported explained here is described in a state of viewing a screen 2.

The member 1 to be supported shown in FIG. 2 is a smartphone. For the member 1 to be supported, each of surfaces in a longitudinal direction at both sides is defined as a side surface portion 6, a bottom surface is defined as a bottom surface portion 5, a top surface is defined as a top surface portion 4, and a back surface is defined as a back surface portion 3. Here, in the member 1 to be supported, the side surface portions 6 and the bottom surface portion 5 have a same thickness t, which is less than 13 mm.

(Main Portion 10)

The stand 7 according to a first embodiment is provided with a main portion 10 made of a board member, as shown in FIG. 1. When the main portion 10 is divided in the up-down direction into three parts including a left board 12, a central board 14 and a right board 16, the main portion 10 is provided with a mount portion 20 which is formed by cutting the central board 14 into a concave shape directed downward. Further, the main portion 10 has an intrusion (insertion) portion 30 provided in the left board 12 connecting consecutively to a left side of the central board 14, and a reception portion 40 provided in the right board 16 connecting consecutively to a right side of the central board 14. That is, since the mount portion 20 is downwardly concave, the main portion 10 as a whole has a generally concave shape directed upward. Note that the positional relationship between the intrusion portion 30 and the reception portion 40 is not limited to the one described above, and the intrusion portion 30 may be provided in the right board 16 and the reception portion 40 in the left board 12.

The main portion 10 is composed of three board members including the left board 12, the central board 14 and the right board 16, as described above, and has a thickness of 1 mm. The main portion 10, in a planar shape before being assembled, has a maximum height of 76 mm in the up-down direction thereof and a maximum width of 280 mm in the left-right direction thereof, and is formed in such a size that two pieces of main portion 10 are accommodated in an A4-size (210×297 mm) area by inverting it. Note that the maximum height in the up-down direction and the maximum width in the left-right direction of the main portion 10 are not limited to the values described above. For example, the main portion 10 may be formed in a smaller size than the above-noted values so that two or more pieces of main portion 10 can be accommodated in an A4-size area, or the main portion 10 may be formed in a larger size than the above-noted values so that only one piece of main portion 10 can be accommodated in the A4-size area.

Further, the main portion 10 is formed of PVC (polyvinyl chloride resin), which is excellent in waterproof property and has appropriate flexibility and rigidity. Note that a material for the main portion 10 is not limited to PVC, but may be paperboard, urethane foam or the like.

Here, as to a lower edge of the main portion 10, a lower edge 15 of the central board is inclined upwardly in the vicinities of both ends thereof, and a lower edge 13 of the left board as well as a lower edge 17 of the right board are inclined upwardly. That is, the lower edge of the main portion 10 is formed such that the lower edge 15 of the central board is a lowermost end, and the lower edge inclines upward gradually from that portion toward a left end of the lower edge 13 of the left board and toward a right end of the lower edge 17 of the right board. Specifically, an angle between the lower edge 15 of the central board and the lower edge 13 of the left board as well as an angle between the lower edge 15 of the central board and the lower edge 17 of the right board (hereafter, denoted as "θ1") is set to 3 degrees. Note that the angle θ1 is not limited to 3 degrees, but may be set to a value in a range of 1 to 6 degrees and even to 0 degrees.

(Mount Portion 20)

As shown in FIG. 1, the mount portion 20 is formed by cutting the central board 14 into a concave shape directed downward so as to be a portion where the member 1 to be supported is mounted when the main portion 10 is assembled. The mount portion 20 is provided with a lower edge portion 26, which is a lower edge of the mount portion 20 where the member 1 to be supported is mounted, and side edge portions 28, which are side edges of the mount portion 20, connecting consecutively from both ends of the lower edge portion 26 and extending upwardly so as to be capable of supporting the back surface portion 3 of the member 1 to be supported.

(Intrusion Portion 30)

As shown in FIG. 1, the intrusion portion 30 is provided in the left board 12 connecting consecutively to the left side of the central board 14. The intrusion portion 30 is used, when the main portion 10 is assembled, to make the main portion 10 into a three-dimensional shape by fitting with the reception portion 40.

The intrusion portion 30 has an intrusion (insertion) slot 32 which is formed upwardly from the lower edge 13 of the left board at a location about ⅓ distant from a left end of the lower edge 13 toward a right end thereof.

Specifically, the intrusion slot 32 includes an intrusion slot first portion 32a which is formed by making a cut of 12 mm upwardly from the location about ⅓ distant from the left end of the lower edge 13 of the left board toward the right end. Further, the intrusion slot 32 includes an intrusion slot second portion 32b which is formed by making a cut of 13 mm rightwardly from an upper end of the intrusion slot first portion 32a. Furthermore, the intrusion slot 32 includes an intrusion slot third portion 32c which is formed by making a cut of 25 mm upwardly from an end of the intrusion slot second portion 32b not connecting consecutively to the upper end of the intrusion slot first portion 32a, in other words, from a right end of the intrusion slot second portion 32b.

Note that the intrusion slot second portion 32b is not limited to the one formed rightwardly from the upper end of the intrusion slot first portion 32a, but may be formed leftwardly from the upper end of the intrusion slot first portion 32a.

Thus the intrusion portion 30 has the intrusion slot first portion 32a and the intrusion slot second portion 32b, and a region between the intrusion slot second portion 32b and the lower edge 13 of the left board serves as a first engaging protrusion 50 in the main portion 10. The first engaging protrusion 50 engages with a first engaging slot 54 described below, when the main portion 10 is assembled.

Moreover, an upper edge of the left board 12 is provided with a second engaging slot 56 by making a cut of 12 mm downwardly from a location opposite to the intrusion slot third portion 32c, the second engaging slot 56 being capable of engaging with a second engaging protrusion 52 described below.

(Reception Portion 40)

As shown in FIG. 1, the reception portion 40 is provided in the right board 16 connecting consecutively to the right side of the central board 14. The reception portion 40 is used, when the main portion 10 is assembled, to make the main portion 10 into the three-dimensional shape by fitting with the intrusion portion 30.

The reception portion 40 has a reception slot 42 which is formed downwardly from an upper edge of the right board 16 at a location about ⅓ distant from a right end of the upper edge toward a left end thereof.

Specifically, the reception slot 42 includes a reception slot first portion 42a which is formed by making a cut of 12 mm downwardly from the location about ⅓ distant from the right end of the upper edge of the right board 16 toward the left end. Further, the reception slot 42 includes a reception slot second portion 42b which is formed by making a cut of 13 mm leftwardly from a lower end of the reception slot first portion 42a. Furthermore, the reception slot 42 includes a reception slot third portion 42c which is formed by making a cut of 25 mm downwardly from an end of the reception slot second portion 42b not connecting consecutively to the lower end of the reception slot first portion 42a, in other words, from a left end of the reception slot second portion 42b.

Note that the reception slot second portion 42b is not limited to the one formed leftwardly from the lower end of the reception slot first portion 42a, but may be formed, in a case where the intrusion slot second portion 32b is formed leftwardly from the upper end of the intrusion slot first portion 32a, rightwardly from the lower end of the reception slot first portion 42a.

Thus the reception portion 40 has the reception slot first portion 42a and the reception slot second portion 42b, and a region between the reception slot second portion 42b and the upper edge of the right board 16 serves as a second engaging protrusion 52 in the main portion 10. The second engaging protrusion 52 engages with the second engaging slot 56 described above, when the main portion 10 is assembled.

Moreover, a lower edge 17 of the right board is provided with the first engaging slot 54 by making a cut of 12 mm upwardly from a location opposite to the reception slot third portion 42c, the first engaging slot 54 being capable of engaging with the first engaging protrusion 50 described above.

(Assembling Method of Stand 7)

Hereafter, an assembling method of the stand 7 according to the first embodiment will be described with reference to FIG. 2.

(1) The main portion 10 is curved, then the intrusion slot 32 is inserted in the reception slot 42 and the intrusion slot third portion 32c and the reception slot third portion 42c are fitted with each other.

(2) The first engaging protrusion 50 is curved toward the first engaging slot 54, then the first engaging protrusion 50 is inserted in the first engaging slot 54, and the first engaging protrusion 50 and the first engaging slot 54 are engaged with each other.

(3) The second engaging protrusion 52 is curved toward the second engaging slot 56, then the second engaging protrusion 52 is inserted in the second engaging slot 56, and the second engaging protrusion 52 and the second engaging slot 56 are engaged with each other.

Note that the steps (2) and (3) may be done in arbitrary order.

(Shape of Stand 7 after Assembling)

Hereafter, a shape of the stand 7 according to the first embodiment after it is assembled will be described.

The stand 7 can be assembled into a three-dimensional shape shown in FIG. 2 from the planar shape shown in FIG. 1 by fitting the intrusion slot 32 formed in the left board 12 and the reception slot 42 formed in the right board 16 with each other as in the above described steps. When the stand 7 assembled is placed on a placing surface for the stand 7, since the stand 7 is heavier at a portion where the left board 12 and the right board 16 are fitted with each other than a portion of the central board 14, and the angle θ1 (see FIG. 1) is formed, the lower edges 17 of the left board and the right board come in contact with the placing surface for the stand 7. Accordingly, the central board 14 floats a little above the placing surface for the stand 7, resulting in a state where the stand 7 as a whole leans backward to a certain extent.

Further, after having been assembled, the stand 7 is in a state where the central board 14 protrudes forward from the left board 12 and the right board 16, so that the member 1 to be supported can be mounted in the mount recesses 22 of the mount portion 20 provided in the central board 14.

The mount recesses 22 are recesses at two locations that are formed in the vicinities of the both ends of the lower edge portion 26 of the mount portion 20 so as to be concave further downwardly.

In other words, "mount recesses 22" are recesses whose width in the left-right direction is made a little greater than a thickness t (see FIG. 2) of the member 1 to be supported. Specifically, the width of the mount recesses 22 in the left-right direction is set to 13 mm. Note that the width of the mount recesses 22 in the left-right direction is not limited to the value described above, but may be another value suitable to a different kind of member 1 to be supported.

On the other hand, a height of the mount recesses 22 in the up-down direction is made such that the member 1 to be supported does not fall off when the member 1 to be supported leans. Specifically, in the first embodiment, the height is set to 10 mm. Note that the height of the mount recesses 22 in the up-down direction is not limited to the value described above, but may be another value suitable to a different kind of member 1 to be supported.

Further, a width of the lower edge portion 26 is made a little shorter than a short side of the member 1 to be supported in order to allow for both vertical placement and horizontal placement of the member 1 to be supported. Specifically, the width of the lower edge portion 26 is set to 72 mm. Note that the width of the lower edge portion 26 is not limited to the value described above, but may be made a little shorter than a long side of the member 1 to be supported, so that the stand 7 is exclusively for horizontal placement. On the other hand, a height of the side edge portions 28 is set such that the member 1 to be supported can be supported reliably when the member 1 to be supported leans against it. Specifically, the height of the side edge portions 28 is set to 60 mm. Note that the height of the side edge portions 28 is not limited to the value described above, but may be another value suitable to a different kind of member 1 to be supported.

Further, an angle between each side edge portion 28 and a vertical line downward from an upper end of the side edge portion 28 (hereafter, denoted as "θ2") is set to 5 degrees. Note that the angle θ2 is not limited to 5 degrees, but may be set in a range of 1 to 10 degrees and even to 0 degree.

(Member 1 to be Supported)

As described above, the member 1 to be supported shown in FIG. 2 is a smartphone. As to the member 1 to be supported, surfaces having a long side are denoted as the side surface portions 6, a surface located the lower among surfaces having a short side is denoted as the bottom surface portion 5, and a surface coming in contact with the side edge portions 28 of the mount portion 20 is denoted as the back surface portion 3. Here, in the member 1 to be supported, the thickness t of the side surface portions 6 and the bottom surface portion 5 is smaller than 13 mm, which is the width of the mount recesses 22 in the left-right direction. Note that although a width of the smartphone itself is approximately between 7 mm to 10 mm, the width of the member 1 to be supported is assumed, in the first embodiment, to be 13 mm at a maximum, considering a situation where a cover is applied to the smartphone.

Note that, for the member 1 to be supported, the surface having the long side may be denoted as the bottom surface 5, the surfaces having the short side may be denoted as the side surface portions 6, or the surface that does not come in contact with the side edge portions 28 of the mount portion 20 may be denoted as the back surface portion 3. Further, the member 1 to be supported is not limited to a smartphone, but may be a tablet terminal, as well as a member such as a photograph, a picture postcard or a package containing refreshing cool candies, instead of an electronic terminal. In this case, depending on the employed member to be supported, the width of the lower edge portion 26 in the left-right direction and the width of the mount recesses 22 in the left-right direction are adjusted for use.

(Mounting Method of Member 1 to be Supported)

Hereafter, a mounting method of the member 1 to be supported will be described with reference to FIG. 2.

Now the main portion 10 has the three-dimensional shape through the steps described above, so that it is in a state where the central board 14 protrudes forward from the left board 12 and the right board 16. Specifically, in a case where the member 1 to be supported is placed vertically, since the thickness t of the bottom surface portion 5 is smaller than a front-back dimension of the mount recesses 22; it is possible to mount the member 1 to be supported with the bottom surface portion 5 being inserted in the mount recesses 22 at two locations in the left-right direction. Note that in a case where the member 1 to be supported is placed not vertically but horizontally, since the thickness t of the side surface portions 6 is smaller than the front-back dimension of the mount recesses 22, it is possible to mount the member 1 to be supported with the side surface portion 6 being inserted in the mount recesses 22 at two locations in the left-right direction.

Further, when the member 1 to be supported is mounted with the bottom surface portion 5 being within the mount recesses 22 at two locations in the left-right direction, since the member 1 to be supported leans backward due to the angle θ2 (see FIG. 1), the back surface portion 3 thereof abuts the side edge portions 28. Thus, with the back surface portion 3 abutting the side edge portions 28 and the bottom surface portion 5 being nipped in a gap between the side edge portions 28 of the mount recess 22 and the lower edge portion 26, the member 1 to be supported is supported by the stand 7.

(Disassembling Method of Stand 7)

Hereafter, a disassembling method of the stand 7 will be described.

(1) The first engaging protrusion 50 is curved and the engagement between the first engaging protrusion 50 and the first engaging slot 54 is released.

(2) The second engaging protrusion 52 is curved and the engagement between the second engaging protrusion 52 and the second engaging slot 56 is released.

(3) The left board 12 is slid upwardly and the connection between the intrusion slot 32 and the reception slot 42 is dissolved.

Note that the steps (1) and (2) may be done in arbitrary order. Further, the step (3) may be performed by sliding the right board 14 downwardly to cancel the fit between the intrusion slot 32 and the reception slot 42.

Operational Advantage of First Embodiment

The stand 7 can be assembled without trouble by only fitting the intrusion slot 32 formed in the left board 12 constituting the main portion 10 and the reception slot 42 formed in the right board 16 constituting the main portion 10 with each other.

Moreover, the stand 7 can be in a planar shape before it is assembled, and even after assembled, it can be disassembled without trouble into a single board, so that it can be carried easily in a travel, business trip or the like. That is, the thickness of the main portion 10 constituting the stand 7 is 1 mm, i.e., about that of cardboard, therefore, in its planar shape, the stand 7 can be sandwiched between notebooks, files and the like for easy accommodation in a bag.

Further, the stand 7 is assembled by fitting the intrusion slot 32 formed in the left board 12 and the reception slot 42 formed in the right board 16 with each other. Therefore, in the stand 7 after assembled, because of the fact that the portion where the left board 12 and the right board 16 are fitted with each other is heavier than the portion of the central board 14 as well as the fact that the angle θ1 (see FIG. 1) is provided, the lower edges 17 of the left board 12 and the right board come in contact with a placing surface for the stand 7.

That is, when the stand 7 having been assembled is placed on a placing surface for the stand 7, the central board 14 floats a little above the placing surface for the stand 7, resulting in a state where the stand 7 as a whole leans backward to a certain extent. As a result, the side edge portions 28 provided in the mount portion 20 also leans backward, the member 1 to be supported can be mounted on the stand 7, in a state of leaning backward with an angle larger than the angle θ2 (see FIG. 1)

Furthermore, in the stand 7, after the intrusion slot 32 and the reception slot 42 are fitted with each other, the first engaging protrusion 50 and the first engaging slot 54 as well as the second engaging protrusion 52 and the second engaging slot 56 are fitted with each other. Accordingly, in the stand 7, the first engaging protrusion 50 and the first engaging slot 54 as well as the second engaging protrusion 52 and the second engaging slot 56 serve as wedges, thereby working as mismatch-suppressing members for preventing dissolution of the engagement between the intrusion slot 32 and the reception slot 42, so that the main portion 10 can be fixed more rigidly.

Thus, the stand 7 can be fixed rigidly while assembled easily, so that it is capable of supporting the member 1 to be supported more stably. That is, since the stand 7 is configured such that, when the intrusion slot 32 and the reception slot 42 are fitted with each other, the first engaging slot 54 and the first engaging protrusion 50 can be engaged with each other, and additionally, the second engaging slot 56 and the second engaging protrusion 52 can be engaged with each other, if vibration or force is applied to the stand 7, it can maintain the three-dimensional shape, so that it can support the member 1 to be supported more stably.

Moreover, by mounting the member 1 to be supported with the bottom surface portion 5 thereof inserted in the mount recesses 22, even if vibration is applied, it is unlikely that the member 1 will come off the mount recesses 22, so that the stand 7 can support the member 1 to be supported more stably than in a constitution where the member 1 to be supported is mounted simply on the lower edge portion 26. Further, in the stand 7, when the member 1 to be supported is mounted while inserted in the mount recesses 22, the member 1 to be supported does not fall off from the stand 7, so that when the member 1 to be supported is assumed to be a smartphone, it is possible to perform operations by touching the screen 2 while the smartphone is mounted on the stand 7. Further, when the member 1 to be supported is assumed to be a smartphone as noted above, the stand 7 can be used even when the smartphone is set in a state where it vibrates, such as in a silent mode.

Furthermore, the stand 7 is made not of paper such as paperboard but of PVC and thus has a good waterproof property unlike one made of paper, so that it can be used also in a water section such as a washroom or bathroom. In addition, since the stand 7 is made of PVC having flexibility, when the main portion 10 is disassembled and assembled repeatedly, it is unlikely to occur a situation where a folding line or the like is formed and that part wears out resulting finally in breakage.

According to the first embodiment, a tablet terminal of large width can be supported in horizontal placement by using two pieces of stand 7.

Further, the stand 7 is formed, in a planar shape before the main portion 10 is assembled, to have a maximum height of 76 mm in the up-down direction thereof and a maximum width of 280 mm in the left-right direction thereof. Accordingly, two pieces of stand 7 can be accommodated in an A4-size (210×297 mm) area by inverting it, so that manufacturing costs can be reduced and manufacturing efficiency can be increased.

Second Embodiment

Hereafter, a second embodiment will be described with reference to FIG. 3. In the second embodiment, for the same components as in the first embodiment, the same reference numbers used in the first embodiment will be used. Further, those parts of description overlapping with what are given in the first embodiment will be omitted.

As shown in FIG. 3, in the stand 7 according to the second embodiment, the mount portion 20 is provided, in addition to the constitution of the first embodiment, with an adjusting protrusion 24 for accepting members 1 to be supported having different thicknesses.

(Mount Portion 20)

As shown in FIG. 3, in the mount portion 20 according to the second embodiment, the mount recesses 22 are made a little larger compared to those in the first embodiment. Specifically, in the second embodiment, the width of the mount recesses 22 in the left-right direction is set to 16 mm. Note that the width of the mount recesses 22 in the left-right direction is not limited to the value described above, but may be another value suitable to a different kind of member 1 to be supported. On the other hand, the height of the mount recesses 22 in the up-down direction according to the second embodiment is the same as that in the first embodiment.

Further, in the mount portion 20, the adjusting protrusion 24 protrudes rightwardly from the left end of the mount recess 22 on the right side. The adjusting protrusion 24 protrudes by 3 mm rightwardly from the left end of the mount recess 22 on the right side. Moreover, the adjusting protrusion 24 is formed such that a width thereof can be altered by folding or cutting away it.

That is, the mount portion 20 according to the second embodiment, can accept, similarly to that in the first embodiment, a member 1 to be supported whose thickness t is 13 mm or less, in a state where the adjusting protrusion 24 protrudes. On the other hand, the mount portion 20 can accept a member 1 to be supported having a thickness t of up to 15 mm by cutting away the adjusting protrusion 24 by 2 mm.

Note that the adjusting protrusion 24 may support members 1 to be supported having different thicknesses by use of an resilient action of the adjusting protrusion 24 itself, instead of being folded or cut away. That is, when the member 1 to be supported is being mounted, the adjusting protrusion 24 may be warped so as to expand the width of the mount recess 22 in the left-right direction up to 16 mm, and after the member 1 to be supported is mounted, the width of the mount recess 22 in the left-right direction may be returned to 13 mm by the resilient action. Note that the adjusting protrusion 24 is not necessarily provided in the mount recess 22 on the right side, but may be provided in the mount recess 22 on the left side, and even in both the mount recesses 22 at the left and right.

Operational Advantage of Second Embodiment

The stand 7 according to the second embodiment has, in addition to the operational advantages of the stand 7 according to the first embodiment, following operational advantages.

In the stand 7, the mount recess 22 is provided with the adjusting protrusion 24, and by folding or cutting away the adjusting protrusion 24, the width of the mount recess 22 in the left-right direction can be adjusted for each member 1 to be supported. Therefore, according to the second embodiment, a single stand 7 can accept members 1 to be supported of various sizes.

Here, with respect to the thickness t of the member 1 to be supported, some room exists in the mount recess 22 on the left side, however, the member 1 to be supported does not fall off from the mount recesses 22 because the member 1 to be supported is held by the adjusting protrusion 24 formed in the mount recess 22 on the right side.

Note that the shape of the mount portion 20 according to the first and second embodiment is not limited to that described above.

Figure 4:
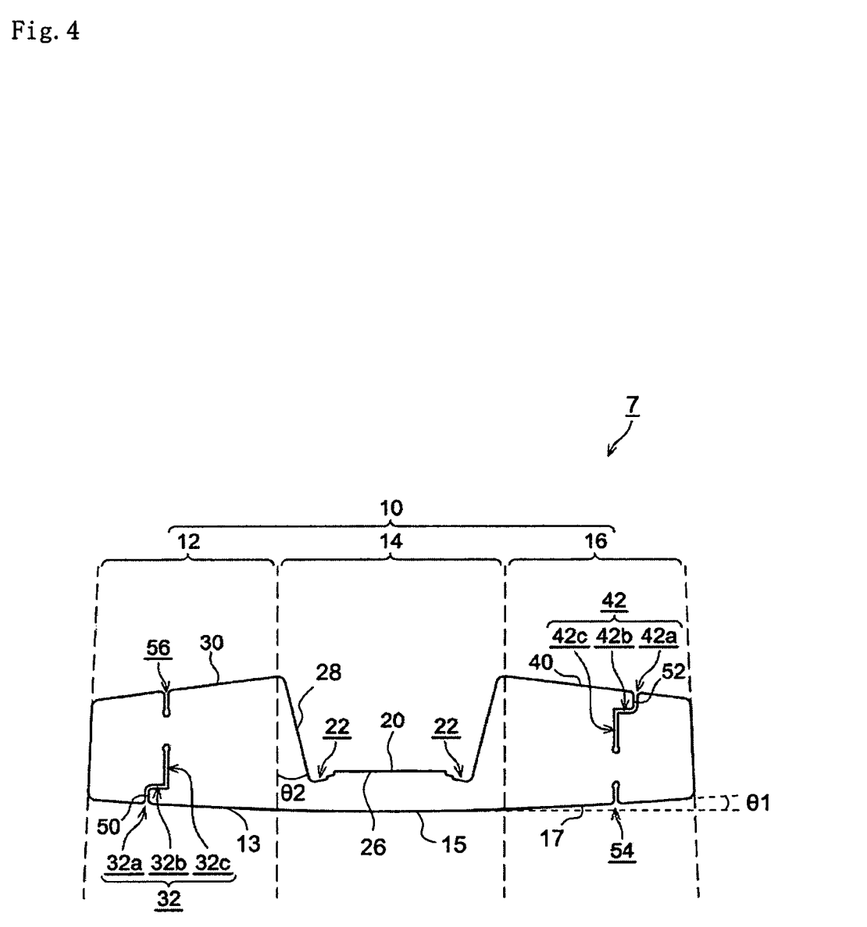
FIG. 4 is a view showing a variation of mount recesses.

For example, as shown in FIG. 4, the mount recesses 22 may have a two-stage construction including an upper stage and a lower stage. In this case, the width of the lower stage of the mount recesses 22 is set to 10 mm, and the width of the upper stage of the mount recesses 22 is set to 6 mm. Accordingly, a single stand 7 can accept a member 1 to be supported whose thickness is in the range of 10 mm to 16 mm.

Figure 5:
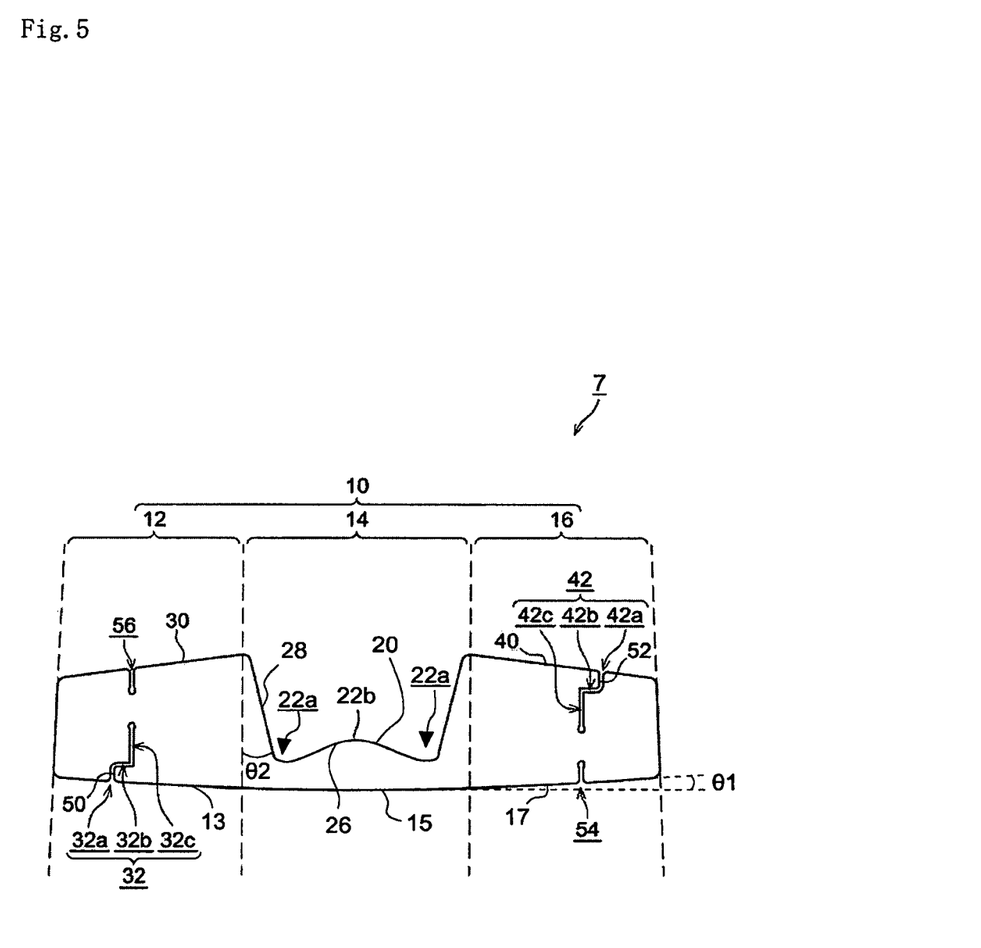
FIG. 5 is a view showing a variation of mount recesses.

Further, as shown in FIG. 5, the mount recesses 22 may be formed into a gentle upward concave shape, when FIG. 5 is viewed normally. That is, the mount portion 20 is provided with concave portions 22a formed, as the mount recesses 22, at two locations left and right in the lower edge portion 26, and a convex portion 22b formed, as an upward convex portion, in the center of the lower edge portion 26.

In this case, the member 1 to be supported, when the bottom surface portion 5 is mounted in the concave portions 22a at two locations, leans backward due to the angle θ2, and the back surface portion 3 of the member 1 to be supported abuts the side edge portions 28. Thus, with the back surface portion 3 abutting the side edge portions 28 and the bottom surface portion 5 being nipped in a gap between the side edge portions 28 and the convex portion 22b, the member 1 to be supported is supported by the stand 7.

The mount recesses 22 can mount a member 1 to be supported at the curved portion of a gentle concave shape thereof, so that it can mount members 1 to be supported of various thicknesses within the range of the width of the curved portion. As described above, the member 1 to be supported mounted in the mount recesses 22 is supported by the stand 7 with the bottom surface portion 5 thereof being nipped in the gap between the side edge portions 28 and the convex portion 22b. Therefore, according to the stand 7 having these mount recesses 22, a single stand 7 can accept members 1 to be supported of various thicknesses.

Figure 6:
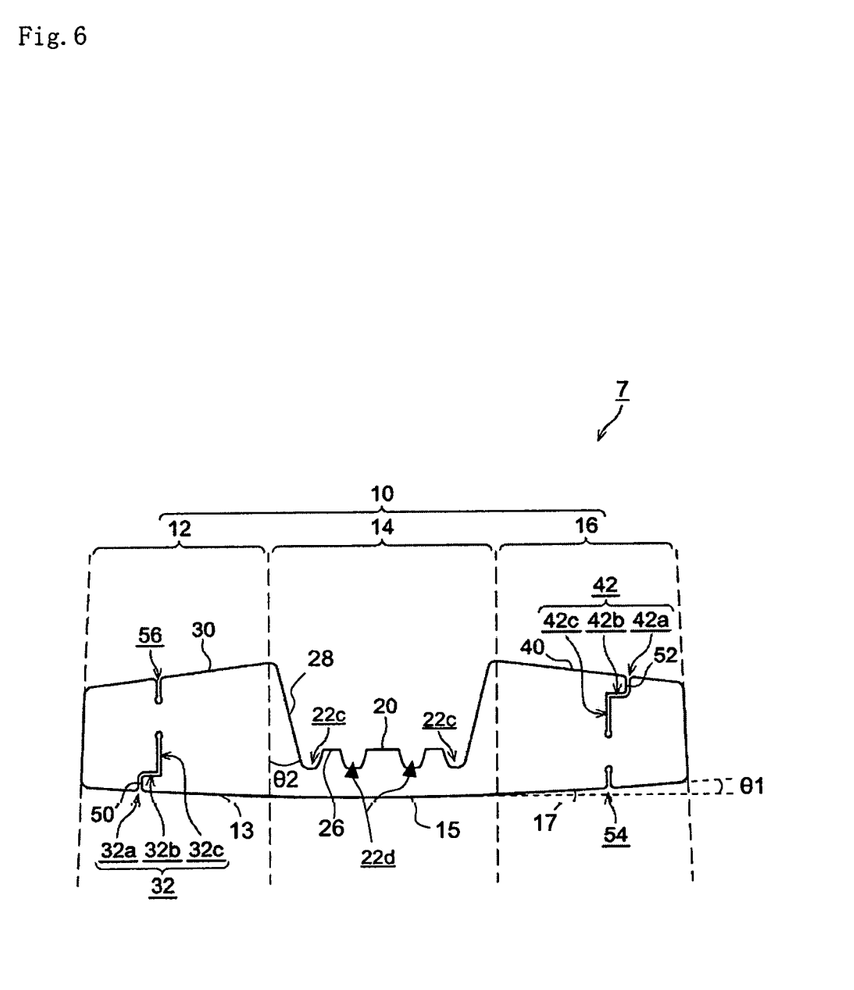
FIG. 6 is a view showing a variation of mount recesses.

Further, as shown in FIG. 6, the mount recesses 22 may be provided with a total of four slots, including end slots 22c formed at two locations in the vicinities of the both ends of the lower edge portion 26 sand central slots 22d formed at two locations in the vicinities of the center of the lower edge portion 26. In this case, when the member to be supported is assumed, for example, to be a smartphone, between the central slots 22*d* at two locations with a shorter distance therebetween, the smartphone can be mounted in vertical placement. On the other hand, when the member to be supported is assumed, for example, to be a smartphone, between the end slots 22*c* at two locations with a longer distance therebetween than the central slots 22*d* at two locations, the smartphone can be mounted in horizontal placement.

Note that a number of the mount recesses 22 shown in FIG. 6 is not limited to four, but may be five or more, allowing the user to select mount recesses 22 for mounting the member 1 to be supported.

The present invention relates to a stand capable of supporting a variety of members to be supported, and can support a smartphone, tablet terminal, photograph, picture post card, refreshing cool candies accommodated in a package or the like. Further, the present invention can be used as an advertising medium for a shop of cellular phone, movie theater, travel agency, major electronic and home appliances retail/chain store, sports team or the like, by applying a logo on an outer surface of a lower portion of the mount portion in the central board or on an outer surface of the left board or the right board.

DESCRIPTION OF REFERENCE NUMERALS

1: member to be supported, 2: screen, 3: back surface portion, 4: top surface portion, 5: bottom surface portion, 6: side surface portion, 7: stand, 10: main portion, 12: left board, 13: lower edge of left board, 14: central board, 15: lower edge of central board, 16: right board, 17: lower edge of right board, 20: mount portion, 22: mount recess, 22*a*: concave portion, 22*b*: convex portion, 22*c*: end slot, 22*d*: central slot, 24: adjusting protrusion, 26: lower edge portion, 28: side edge portion, 30: intrusion portion, 32: intrusion slot, 32*a*: intrusion slot first portion, 32*b*: intrusion slot second portion, 32*c*: intrusion slot third portion, 40: reception portion, 42: reception slot, 42*a*: reception slot first portion, 42*b*: reception slot second portion, 42*c*: reception slot third portion, 50: first engaging protrusion, 52: second engaging protrusion, 54: first engaging slot, 56: second engaging slot

What is claimed is:

1. A stand comprising a main portion made of a board member,
wherein when said main portion is divided in an up-down direction into three parts including a left board, a central board and a right board, said main portion comprises a mount portion which is formed by cutting said central board into a concave shape directed downward, an intrusion portion formed either one at said left board connecting consecutively to a left side of said central board or at said right board connecting consecutively to a right side of said central board, and a reception portion formed either one at said right board connecting consecutively to the right side of said central board or at said left board connecting consecutively to the left side of said central board, said intrusion portion and said reception portion being positioned opposite to each other through said central board,
wherein said intrusion portion is provided with an intrusion slot formed upwardly from a lower edge of either one of said left board or said right board that is provided with said intrusion portion,
wherein said reception portion is provided with a reception slot formed downwardly from an upper edge of either one of said right board or said left board that is provided with said reception portion, said reception slot being capable of fitting with said intrusion slot,
wherein said main portion is configured such that said intrusion slot and said reception slot are fitted with each other to make said central board protrude to the front in a front-back direction from said left board and said right board, so that a member to be supported can be mounted at a lower edge of said mount portion, and
wherein said reception slot is fitted with said intrusion slot at the back when assembled as said main portion is curved without making a folding crease thereon.

2. A stand of claim 1, wherein from vicinities of both ends of a lower edge of said central board to the lower edge of said left board or said right board, respective lower edges are inclined upwardly.

3. A stand of claim 1,
wherein said mount portion is provided with mount recesses at two locations which mount recesses are concave further downwardly, in vicinities of both ends of the lower edge of said mount portion, and
wherein said main portion is configured such that said intrusion slot and said reception slot are fitted with each other to make said central board protrude to the front in the front-back direction from said left board and said right board, so that the member to be supported can be fitted in said mount recesses at two locations and mounted thereon.

4. A stand of claim 1,
wherein said intrusion slot comprises an intrusion slot first portion formed upwardly from the lower edge of either one of said left board or said right board that is provided with said intrusion slot, an intrusion slot second portion formed rightwardly or leftwardly from an upper end of said intrusion slot first portion, and an intrusion slot third portion formed upwardly from an end of said intrusion slot second portion, the end not connecting consecutively to the upper end of said intrusion slot first portion,
wherein a region between said intrusion slot second portion and the lower edge of either one of said left board or said right board that is provided with said intrusion slot is a first engaging protrusion,
wherein said reception slot comprises a reception slot first portion formed downwardly from the upper edge of either one of said right board or said left board that is provided with said reception slot, a reception slot second portion formed leftwardly or rightwardly from a lower end of said reception slot first portion, and a reception slot third portion formed downwardly from an end of said reception slot second portion, the end not connecting consecutively to the lower end of said reception slot first portion,
wherein a region between said reception slot second portion and the upper edge of either one of said right board or said left board that is provided with said reception slot is a second engaging protrusion,
wherein a second engaging slot capable of engaging with said second engaging protrusion is formed in the upper edge of either one of said left board or said right board that is provided with said intrusion slot and opposite to said intrusion slot third portion,
wherein a first engaging slot capable of engaging with said first engaging protrusion is formed in the lower edge of either one of said right board or said that is provided with said reception slot and opposite to said reception slot third portion, and wherein said main portion is configured such that when said intrusion slot third portion and said reception slot third portion are fitted with each other, said first engaging slot and said first engaging protrusion can engage with each other, and further, said second engaging slot and said second engaging protrusion can engage with each other.

\* \* \* \* \*